Nov. 16, 1926.

J. A. MILLER 1,606,770

HANDLE BAR STRUCTURE

Filed Nov. 27, 1925

Inventor,
John A. Miller
By Brown, Boettcher & Dienner
Attys.

Patented Nov. 16, 1926.

1,606,770

UNITED STATES PATENT OFFICE.

JOHN A. MILLER, OF HOMEWOOD, ILLINOIS.

HANDLE-BAR STRUCTURE.

Application filed November 27, 1925. Serial No. 71,579.

My invention relates to handle bar structure for pleasure railway cars, particularly for coaster cars having a row of transversely extending seats.

An important object of the invention is to produce simple, compact handle bar and supporting structure between the seats for assisting the entrance and exit of passengers and for affording supporting grips when the car is in operation. Another object is to provide handle bar structure which will be automatically locked in operative position and will then serve both as a grip support and as a guard for holding the passengers in their seats.

Another feature of the invention is the extension of the side walls of the car seats to form supporting brackets for and between which the handle bar structure is supported. Such supporting bracket structure will also permit the handle bar radius of swing to be reduced to a minimum, so that the leverage strain on the handle bar will be reduced.

The various features of my invention are incorporated in the structure shown on the drawings, in which:—

Figure 1:
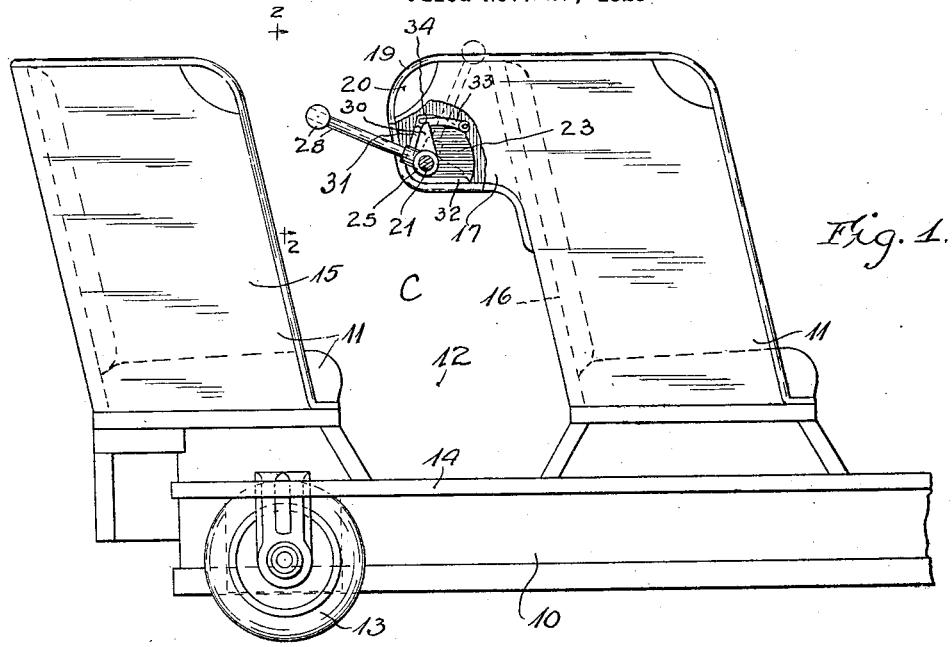
Figure 1 is a side elevational view of the rear end of a pleasure railway car showing my improved handle bar structure applied to one of the seats.
Figure 2:
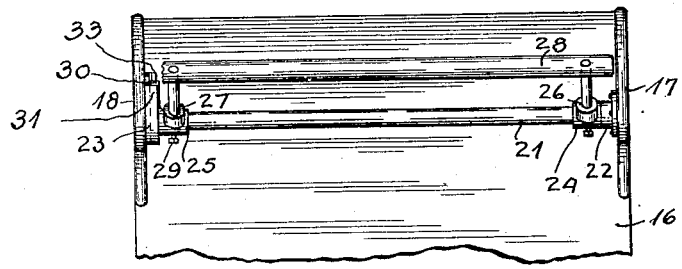
Fig. 2 is a rear view of the handle bar structure and part of the supporting seat.
Figure 3:
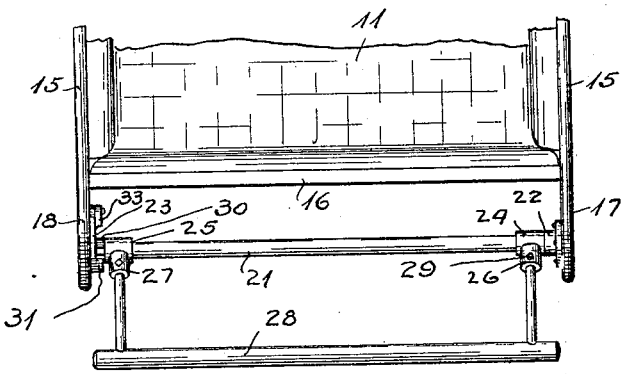
Fig. 3 is a top view of the handle bar structure.

The car C shown comprises a body 10 on which is a row of transverse seat structures 11 between which are the aisles 12 for the entrance and exit of passengers. The car body is mounted on wheels 13 over which extend the running boards 14.

In order to insure safety means should be provided for guiding and supporting the passengers during entrance or exit, and for affording a support for the passengers when they are seated and the car is traveling. Such means is usually in the form of handle or grip structures, or rails, and the object of my invention is to produce improved structure of this nature. Each seat structure frame comprises side walls 15 and a rear wall 16, and for the purposes of my invention I extend the side walls rearwardly at their upper ends to form on each seat structure the opposed brackets or wings 17 and 18 between which my improved supporting and handle bar structure is located. In order to strengthen the side walls and the brackets bars 19 are secured along the edges thereof and the upper rear corners of the brackets are cut away to leave the openings 20 for the insertion of the fingers, so that the exposed bar 19 may be grasped.

Extending between the brackets at the lower rear corners thereof is a shaft 21 which is journaled at its ends in the bearing fittings 22 and 23 secured to the inner sides of the brackets 17 and 18, respectively. Adjacent to these fittings sleeves 24 and 25 are secured to the shaft and have the radially extending sockets 26 and 27 for receiving the ends of the U-shaped handle bar 28. The handle bar ends may be securely held in the sockets by set screws 29.

Extending from the sleeve 25 along side the bearing fitting 23 is the stop arm 30, and on the bearing fitting are the stop abutments 31 and 32 against which the stop arm abuts when the handle bar is respectively in its outer or inner position. When the handle bar is in its outer or operative position it extends towards the seat behind the one on which it is mounted so as to afford a supporting hand rail for the passengers. When the handle bar is in its inner or inoperative position it is swung upwardly into the space between the brackets 17 and 18, as indicated in dotted lines in Fig. 1. To hold the handle bar in its outer or operative position a latch dog 33 is pivoted at its inner end to the bearing fitting 23 with its outer end overlying the path of the stop arm, and the dog has the latch or abutment shoulder 34 which drops into place behind the stop arm 30 when the handle bar is in its outer or operative position and the bar will thus be locked in this position. When the dog is raised the handle bar will be free to be swung to its inoperative position, which position will be held by the engagement of the stop arm against the stop 32. In its outer position the handle bar stop arm abuts against the stop 31 and then when the dog is in engagement with the arm, the handle bar will be rigidly locked in operative position and releasable only by raising the dog. When the car is at rest at the loading or unloading platform, the handle bar is raised to its inoperative position to be out of the way of passengers either entering or leaving the car, and during such entrance or exit movements of the passengers they may support themselves by gripping the bars 19 at the grip section 20 or by grasping the shaft 21. When the passengers are seated preparatory to a ride on the car, the handle bar is swung downwardly into its operative and locked position and the passengers can then support themselves by grasping the handle bar, and as the handle bar is locked the passengers will be prevented from suddenly rising or being thrown from their seats.

By providing the extensions or wings 17 and 18 on the seats for supporting the handle bar structure, the handle bar radius swing can be very much shortened and thus the leverage strain on the handle bar support materially relieved. The extensions or wings do not interfere with the rapid entrance or exit of passengers as the space between the seats below the wings is unrestricted and by slightly bending passengers can readily enter or leave the car.

The handle bar structure described is very simple, compact, easily installed and very effective.

I claim the following:—

1. In a pleasure railway car, the combination of a seat structure comprising side walls and a rear wall, said side walls at their upper rear corners being extended rearwardly to form opposed parallel supporting brackets, a U-shaped handle bar structure journaled at its ends in said brackets and adapted to swing into position between said brackets or to operative position extended rearwardly of said brackets, and abutments on one of said brackets for holding said handle bar in either inner or outer position.

2. In a pleasure railway car, the combination of a row of seat structures each comprising side walls and a back wall, the side walls of each seat structure being extended rearwardly at their upper rear corners to form opposed parallel supporting brackets, a handle bar structure journaled in said brackets to swing into position between said brackets or to outer position extended rearwardly of said brackets, a stop arm on said handle bar structure, abutments on one of said brackets for limiting the outward and inward movement of said handle bar structure, and a latch for co-operating with said stop arm to lock said handle bar structure in its outer position.

3. In a pleasure railway car, the combination of a row of seats each having side walls and a rear wall, the side walls of each seat at their upper rear corners being extended beyond the rear wall to form opposed parallel supporting brackets, a shaft extending between and journaled in said brackets, a U-shaped handle bar extending from said shaft to swing into position either between said brackets or to outer operative position extended rearwardly of said brackets, a stop arm on said shaft, abutments on one of said brackets for limiting the outward and inward swing of said handle bar, and a latch dog pivoted on one of said brackets for engaging said stop arm to lock said shaft with the handle bar in outer position.

4. In a pleasure railway car, the combination of a row of seats each comprising side walls and a rear wall, the side walls of the seats in front of the rear seats being extended rearwardly at their upper corners to form opposed parallel supporting brackets, a handle bar structure journaled at its ends in said brackets and adapted to swing to inoperative position between said brackets or to operative position extended rearwardly of said brackets in front of the adjacent seats, and abutments on said handle bar structure, abutments on one of said brackets for co-operating with said handle bar structure abutments to limit the outward and inward swing of said handle bar structure, and a latch for co-operating with said handle bar structure abutments for locking said handle bar structure in its outer operative position.

In witness whereof, I hereunto subscribe my name this 20th day of November, 1925.

JOHN A. MILLER.